No. 617,334. Patented Jan. 10, 1899.
E. P. GLEASON.
DEVICE FOR REMOVING BLOW OVERS.
(Application filed Sept. 13, 1898.)
(No Model.)
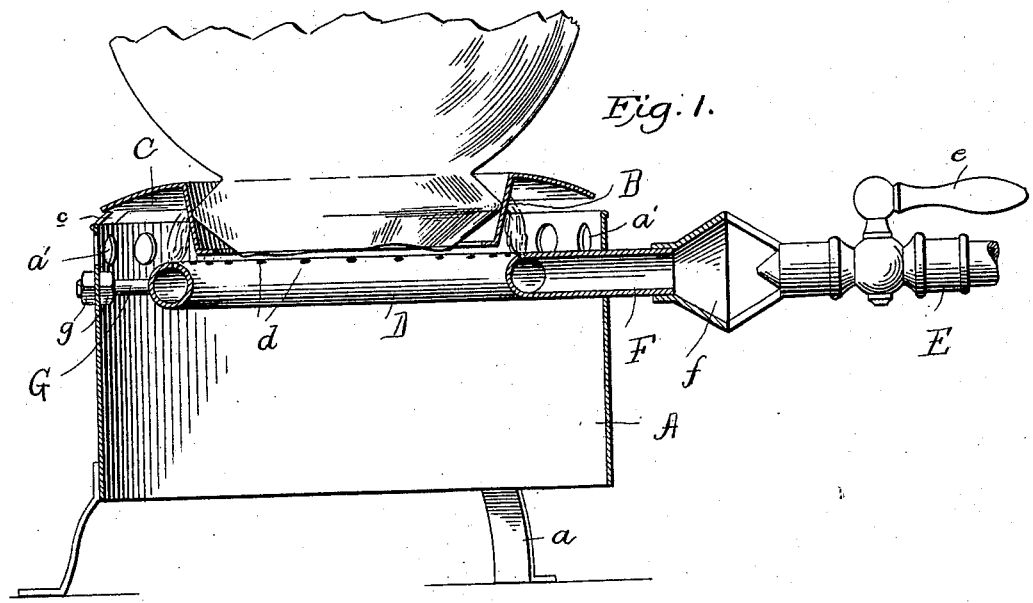
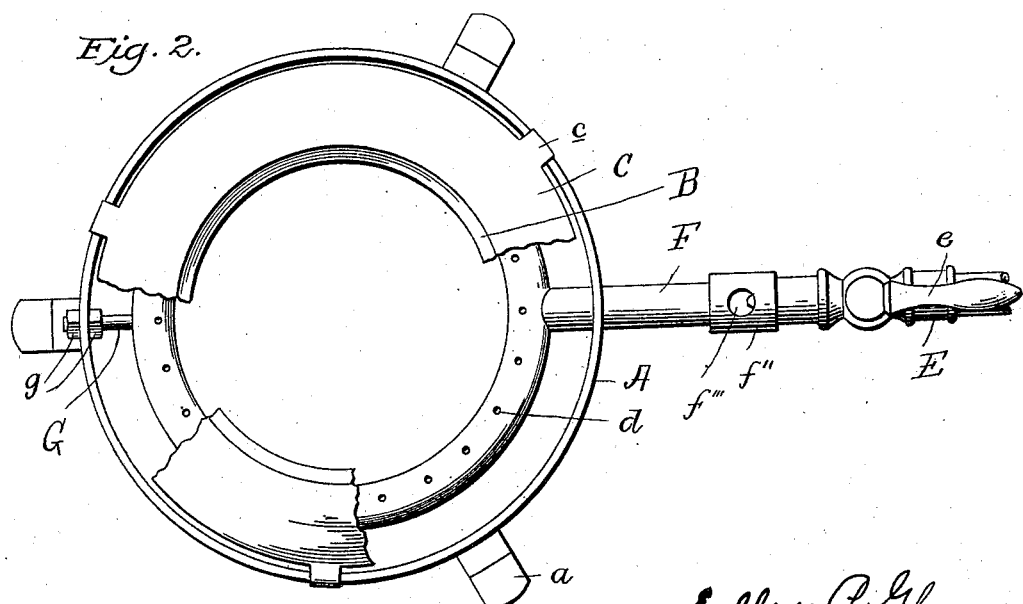
WITNESSES
INVENTOR
Elliott P. Gleason
BY CJ Stockman
ATTORNEY

UNITED STATES PATENT OFFICE.

ELLIOTT P. GLEASON, OF NEW YORK, N. Y.

DEVICE FOR REMOVING BLOW-OVERS.

SPECIFICATION forming part of Letters Patent No. 617,334, dated January 10, 1899.

Application filed September 13, 1898. Serial No. 690,857. (No model.)

*To all whom it may concern:*

Be it known that I, ELLIOTT P. GLEASON, a citizen of the United States, and a resident of New York, in the county of New York and State of New York, have invented certain new and useful Improvements in Devices for Removing Blow-Overs Formed in the Production of Glass Globes, &c., of which the following is a specification.

This invention relates to devices for heating the high parts of blow-overs produced in the manufacture of glass globes, &c., so that the same will crack off when subjected to the action of a chilling agent while still hot.

The object of the invention is to produce a device for the purpose stated which shall be of most simple, durable, and inexpensive construction and the use of which will obviate the necessity of employing power devices.

To this end the invention consists in the peculiar construction hereinafter fully described, and definitely set forth in the claims.

In the accompanying drawings, illustrating the invention, Figure 1 is a vertical section through a heating device constructed in accordance with my invention and showing a part of a globe in position therein. Fig. 2 is a plan view of the same with a part of the heating-ring broken away and with a slightly-different form of air and gas mixer.

A designates a cylinder mounted upon legs $a$ and having an open upper end into which projects a ring B, which is of such diameter relatively to said cylinder as to leave a flame-chamber between them. Above said flame-chamber is a shield C, which projects outward from the upper edge of said ring and preferably is integral with the latter. The periphery of said shield has depending lips $c$, which rest on the upper edge of the cylinder A and support said shield and ring. The shield and ring are constructed of a material which will be quickly heated and will retain heat for a maximum period of time.

In the use of the device the globe or other glass article having a blow-over to be removed is set within the heating-ring B with the high part of its blow-over in contact with the inner wall of said ring, and flames from a burner are directed against the outer wall of the ring at a place opposite said high part, whereby the blow-over is quickly heated to the temperature which will cause it to crack off when plunged into a bucket or barrel containing cold water. In order that the ring will sustain the globe in position while the blow-over is being heated and will most effectively heat the high part of the blow-over, said ring is of definite depth and of gradually-decreasing diameter from top to bottom. To heat the wall of said ring uniformly all around, I employ a ring-burner D, which is arranged contiguous to said ring B and has a number of jet orifices or openings $d$, which direct flame against various portions of the outer wall of the ring B. This burner is preferably supported by a suitable number of rods or pins G, which project from it and are attached to the wall of the cylinder A by nuts $g\,g$, threaded on its outer end, as indicated in Fig. 2. To most efficiently support combustion the wall of the cylinder A is formed with a number of openings $a'$ for the ingress of air to the flames.

E designates a gas-supply pipe having a cock $e$, and F indicates an air-and-gas mixer which conducts the mixed air and gas to the burner D. In the construction shown in Fig. 1 the mixer F has a funnel-shaped inlet end $f$ connected with the gas-supply pipe by arms $f'$, which latter are arranged to leave open spaces for the ingress of air, which mixes with the gas rapidly flowing from the pipe E. In the form shown in Fig. 2 pipes E and F are connected by a coupling $f''$, having openings $f'''$ between the ends of said pipes for the admission of air. Either of the forms mentioned or any other suitable construction of air-and-gas mixer may be employed without departing from the spirit of the invention.

From the above it will be seen that the high parts of blow-overs will be most effectively and quickly heated preparatory to being cracked off by a means which is of most cheap and durable construction and does not depend upon the use of electricity or other expensive and unsatisfactory heating medium and in which the use of rotating devices is obviated. In practice a series of these devices are employed. The operator passes from one to another and places a blow-over in the heating-ring of each. When the series of rings have been thus filled, the blow-over in the first one will have been heated sufficiently to cause it to crack off when suddenly chilled, so that the operator may now, starting with the first one, remove them and plunge them into water or other chilling agent successively, thus saving time otherwise lost in waiting for the blow-over to be heated. In this way and by this means a greater number of blow-overs may be removed in a given period of time than heretofore posssible.

Having thus described the invention, what I claim is—

1. A device for heating blow-overs, comprising a cylinder, a burner in said cylinder, and a heating-ring constructed to receive the blow-over to be removed and interposed between said burner and blow-over, substantially as described.

2. In a device for heating blow-overs, the combination of the heating-ring constructed to receive the blow-over, and a ring-burner adjacent to said heating-ring, having a series of openings through which flames are directed against the outer surface of said heating-ring, substantially as described.

3. In a device for heating blow-overs, the combination of the cylinder, the heating-ring in the mouth of said cylinder, said cylinder and ring being relatively constructed to provide a flame-chamber between them, a shield covering said flame-chamber, and a burner in said chamber, substantially as described.

4. In a device for heating blow-overs, the combination of the cylinder, the heating-ring in the mouth of said cylinder, said cylinder and ring being relatively constructed to provide a flame-chamber between them, a shield over said flame-chamber, and a ring-burner adjacent to said heating-ring, having a series of openings through which flames are directed against the outer surface of the heating-ring, substantially as described.

5. In a device for heating blow-overs, the combination of the horizontal ring constructed to receive blow-overs and of gradually-reducing diameter from top to bottom, and a ring-burner arranged adjacent to said heating-ring and constructed to direct a series of flames against the outer surface of the same, substantially as described.

6. In a device for heating blow-overs, the combination of the cylinder, a heating-ring projecting into the mouth of said cylinder, said ring being of gradually-reducing diameter from top to bottom and of such diameter relatively to the cylinder as to leave a flame-chamber between them, a shield covering said flame-chamber, and a burner in said flame-chamber, substantially as described.

7. In a device for heating blow-overs, the combination of the cylinder, a heating-ring projecting into the mouth of said cylinder, said ring being of gradually-reducing diameter from top to bottom and so related to the cylinder as to leave a flame-chamber between them, a shield projecting from said ring over said chamber, and a ring-burner in said chamber, having a series of openings through which flames are directed against various portions of the outer surface of said heating-ring, substantially as described.

8. In a device for heating blow-overs, the combination of the heating-cylinder, having an open mouth and air-inlets adjacent to said mouth, the heating-ring projecting into said mouth, said ring being constructed to receive and support the blow-over to be heated, and so related to said cylinder as to leave a flame-chamber between them, a shield projecting from said ring over said chamber, a ring-burner supported in said cylinder adjacent to said air-inlets and having a series of openings through which flames are directed against various portions of the outer surface of said air heating-ring, a gas-supply pipe, and an air and gas mixer leading from said supply-pipe to said ring-burner, substantially as described.

In testimony that I claim the foregoing as my invention I have signed my name, in presence of two witnesses, this 22d day of August, 1898.

ELLIOTT P. GLEASON.

Witnesses:
C. J. STOCKMAN,
E. F. GENNERT.